E. B. MOSELEY.
FILING APPLIANCE.
APPLICATION FILED JAN. 13, 1910.

1,153,562.

Patented Sept. 14, 1915.
5 SHEETS—SHEET 5.

Witnesses
Edwin L. Bradford
Geo. B. Pitts.

Inventor
Emerson B. Moseley
By
Edward R. Alexander
Attorney

COLUMBIA PLANOGRAPH CO., WASHINGTON, D. C.

UNITED STATES PATENT OFFICE.

EMERSON B. MOSELEY, OF ALLIANCE, OHIO, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,153,562.  Specification of Letters Patent.  Patented Sept. 14, 1915.

Application filed January 13, 1910. Serial No. 537,965.

*To all whom it may concern:*

Be it known that I, EMERSON B. MOSELEY, a citizen of the United States, residing at Alliance, in the county of Stark and State of Ohio, have invented certain new and useful Improvements in and Relating to Filing Appliances, of which the following is a specification.

This invention relates to filing appliances adapted to hold in systematic order papers or paper slips.

For the purpose of illustration, I have shown in the accompanying drawing, and herein described, one form of filing appliance embodying my invention.

In the drawings, 1 indicates a housing or casing. This housing or casing is shown as constructed or provided with a desk portion $1^a$ having a hinged top $1^b$, a back $1^c$, and an upright member $1^d$. The housing or casing 1 may also be provided with a horizontal plate or base 2.

3 indicates a series of slip holding leaves carrying clamping or securing devices $3^{a'}$.

In the preferred form of my construction each leaf 3 is formed from two thin metallic plates $3^d$, $3^d$, placed back to back. The opposite ends of the plates $3^d$, $3^d$, are bent at substantially right angles in opposite directions as shown at $3^{d'}$ to form end walls for the opposite faces of the leaf.

$3^e$ indicates a binding member, preferably of U-shape, and extending along the opposite bent over side edges $3^{d'}$ and the lower edge of the leaf. The binding strip $3^e$ operates as a plate to which the bent over edges $3^{d'}$ of the plates $3^d$, $3^d$ are secured, and also provides a suitable support for the hinge connection between the leaves as will be hereinafter described.

$3^f$, $3^f$, $3^{f'}$, indicate strips extending from side edge to side edge of and mounted upon the opposite faces of each leaf. The strips $3^f$ are arranged along the upper and lower edges on each face of an adjacent leaf, while the strip $3^{f'}$ extends parallel to and preferably midway between the strips $3^f$, $3^f$. It will be understood that each strip $3^f$ or $3^{f'}$ upon one face of a leaf alines with a corresponding strip upon the opposite face of the leaf, so that each two alined strips may be secured to the adjacent leaf by the same means.

$3^g$ indicate a series of T-shape openings or apertures formed in the inner side of each of the strips $3^f$ and in the opposite sides of the strip $3^{f'}$. It will be understood that the apertures $3^g$ in one side of a strip aline with the apertures formed in the opposing side of an adjacent strip.

Figure 4:
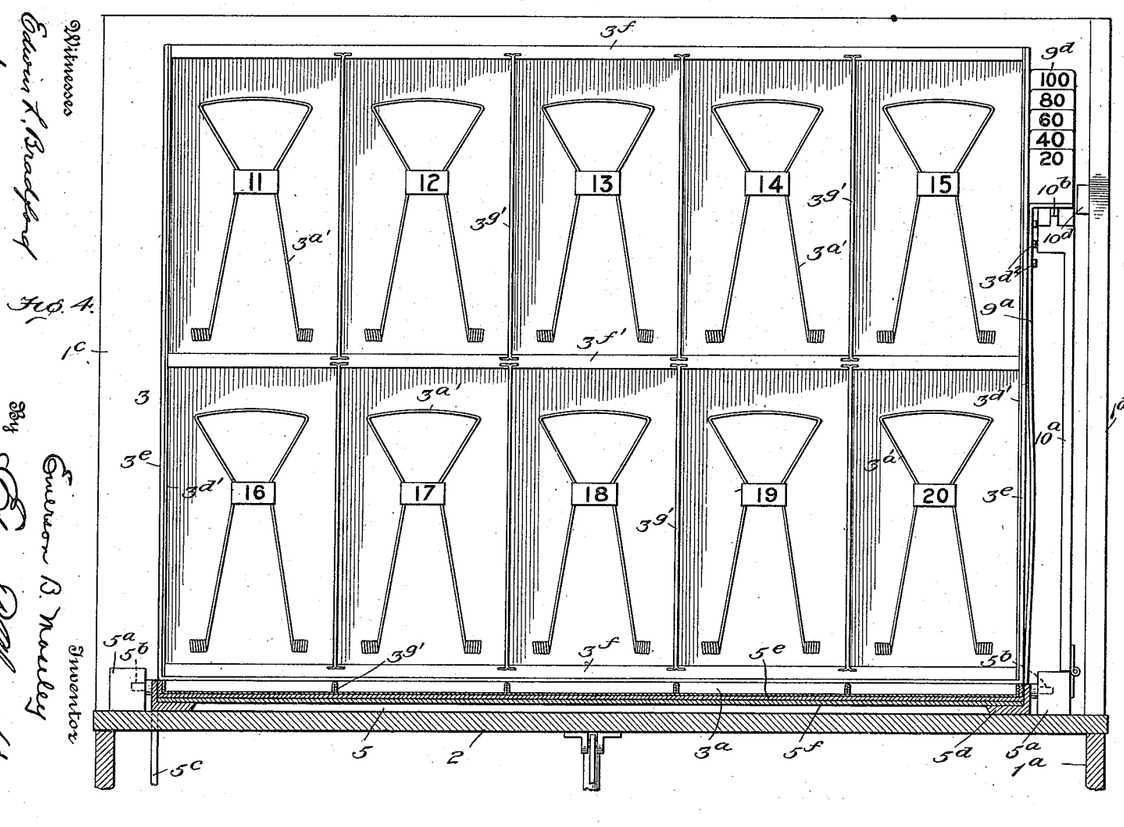
Fig. 4 is a transverse section of the appliance with the follower and frontmost leaf secured thereto, in reclined position.
Figure 9:
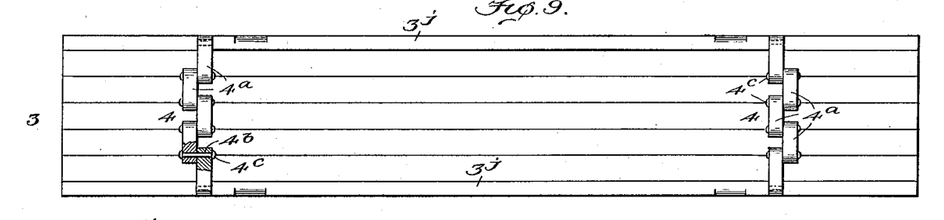
Fig. 9 is a bottom plan view of the series of leaves.
Figures 10, 11, 12, 13, 14, 15, 16:
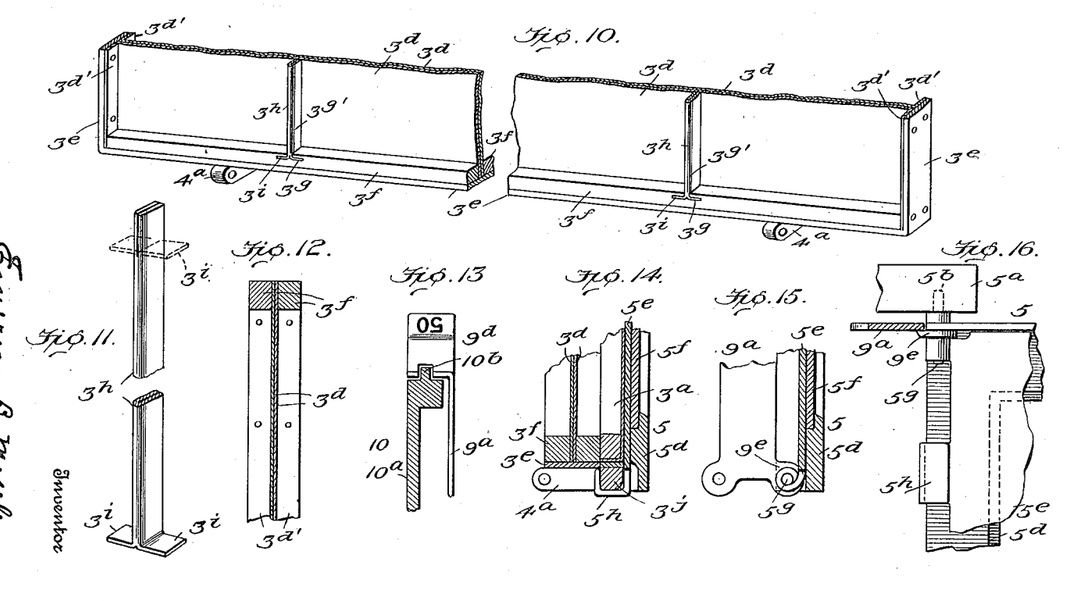
Fig. 10 is a perspective view of the lower portion of one of the leaves or bill holders.
Fig. 11 is a perspective view of a dividing plate.
Fig. 12 is a fragmentary sectional view through a portion of a leaf or bill holder.
Fig. 13 is a fragmentary sectional view through the rod-operating plate, showing one of the operating devices in engagement therewith.
Fig. 14 is a fragmentary sectional view showing the connection or means for supporting the frontmost leaf of the series of leaves upon the follower.
Fig. 15 is a fragmentary sectional view illustrating the pivotal connection between the leaf-operating rods and the follower.
Fig. 16 is a fragmentary sectional view of the parts shown in Fig. 15, with the follower in reclined position, and illustrating the pivotal connections between the follower, the adjacent leaf-operating rod, and a support for the follower.

$3^{g'}$ indicate a series of dividing plates extending between and secured to the opposing walls or faces of the strips 3$^f$ and 3$^{f'}$ upon the opposite faces of each leaf. The plates 3$^{g'}$ are spaced relative to each other and the end walls of the leaf to divide each face of the leaf into slip-receiving spaces. Each plate 3$^{g'}$ is somewhat longer than the distance between the opposing walls of two strips 3$^f$, 3$^{f'}$ and comprises a bar or strip having lips 3$^i$, 3$^i$, at its opposite ends and bent at right angles to the bar and in opposite directions. The ends of the bar and lips 3$^i$ are inserted into the apertures 3$^g$ and thus secure the plates 3$^{g'}$ in position. In this form of construction it will be seen that the plates 3$^{g'}$ and strips 3$^f$, 3$^{f'}$, are secured to each other in a manner that will prevent the displacement or separation thereof, and that the plates 3$^{g'}$ cannot be disconnected from the strips 3$^f$, 3$^{f'}$, by strains which may be transmitted to them intermediate their ends in a direction parallel to the strips 3$^f$, 3$^{f'}$. Each plate 3$^{g'}$ is preferably formed from a section of thin metal, doubled upon itself along a central longitudinal line 3$^h$. The doubled plate is slitted a short distance inwardly from its opposite ends along the line of fold to form the lips 3$^i$, 3$^i$, which are bent at right angles to the strip and in opposite directions, as shown in Fig. 11. The strips 3$^f$, 3$^{f'}$ are preferably formed of wood in order that the bent over ends or lips 3$^i$, 3$^i$ of the plates 3$^{g'}$ may be driven directly into the strips 3$^f$, 3$^{f'}$, as shown in Figs. 4 and 10, thus obviating the necessity of forming apertures 3$^g$ in the strips 3$^f$, 3$^{f'}$. It will also be understood that the strips 3$^f$ on opposite faces of each leaf along the free edge thereof impart rigidity to the leaf, and that the same means which secure alined strips to the leaf operate to maintain the metallic plates 3$^d$, 3$^d$ back to back. As the front leaf 3$^a$ and the rear leaf 3$^b$ carry or support paper slips upon one face only it will be understood that each of these leaves is formed from a single plate 3$^d$, and that only one set of strips 3$^f$, 3$^{f'}$ and plates 3$^{g'}$ are secured thereto.

4 indicate connections between the leaves hingedly connecting them together. The hinge connections 4 are arranged along the lower edges of the leaves and permit them to be swung, one by one or in groups, from a vertical to a horizontal position, and vice versa. The connections 4 between the leaves 3 preferably comprise a series of bars 4$^a$, each rigidly secured to an adjacent leaf 3. There are preferably two series of bars 4$^a$ arranged near the opposite ends of the leaves. Each bar 4$^a$ is rigidly secured to the lower face of an adjacent binding strip 3$^e$. The bars 4$^a$ extend in opposite directions beyond the edges of the adjacent leaf 3 or strip 3$^e$, thus overlapping the adjoining ends of adjacent bars.

4$^b$ indicate apertures formed in the opposite ends of each bar 4$^a$ and adapted to register with the apertures formed in the adjacent bars 4$^a$.

4$^c$ indicate pintles or pivot pins extending through the apertures of two adjoining bars 4$^a$ and hingedly connecting the bars 4$^a$, and the leaves 3 secured thereto, together. The opposite ends of the pintles 4$^c$ are riveted or turned over to hold them in place, and also to keep the abutting faces of the bars 4$^a$ together. By reference to the drawings it will be understood that the bars 4$^a$ are so arranged on alternate leaves that one side face of each bar 4$^a$ will abut against the side faces of two adjoining bars 4$^a$ in order to prevent endwise movement of one leaf relative to another leaf.

5 indicates a follower or carrier for supporting the front end of the series of leaves.

5$^a$, 5$^a$ indicate spaced supports provided with suitable bearings which receive pins or pivots 5$^b$ carried by the follower 5 near its opposite lower corners.

5$^c$ indicates an arm or lever fixed to the frame 5. This lever 5$^c$ depends through a slit 1$^e$ formed in the horizontal plate or base 2.

6 indicates a tension device having one end connected to the free end of the lever 5$^c$. The other end of the tension device 6 is secured to some suitable fixed connection in the housing or casing 1. Preferably this device 6 consists of a long coiled spring which is carried around a pulley 6$^a$ mounted in the casing 1. The tension device 6 preferably operates to normally press the follower upwardly into vertical position, and also to yieldingly resist the downward movement thereof and thereby preventing a slamming of the frame upon the base or hinged top of the casing. The follower 5 is shown as comprising a frame 5$^d$ and a backing plate 5$^e$ between which an index sheet 5$^f$ may be placed. The plate 5$^e$ is preferably hinged, by means of pins 5$^g$, to the frame 5$^d$.

5$^h$ indicates rests or supporting devices, preferably carried by the plate 5$^e$, and upon which the foremost leaf 3$^a$ of the series of leaves rests. Each of the rests 5$^h$ is shown as a hook member, which lies under and engages the walls of a bar 3$^j$ carried by the lower edge of the front leaf 3$^a$.

7 indicates means for locking the upper edge of the front leaf 3$^a$ to the follower. These means preferably comprise a member 7$^a$ projecting from the plate 5$^e$ and formed with an aperture 7$^b$.

7$^c$ indicates a shaft or pin loosely mounted in the aperture 7$^b$. The pin 7$^c$ is provided with two lugs 7$^{c'}$, 7$^{c'}$, projecting laterally in the same direction from one side of the shaft 7$^c$ and arranged upon opposite sides of the projecting member 7$^a$. By rotating the pin 7ᶜ, by means of a finger knob 7ᵈ, the locking lugs enter depressions or recesses 7ᵉ, 7ᶠ, formed respectively in the free edges of the frame 5ᵈ and front leaf 3ª, and simultaneously lock the plate 5ᵉ, the front leaf 3ª and the frame 5ᵈ rigidly together.

8 indicates guide devices for controlling the rearmost leaf 3ᵇ, whereby its free edge and the free edges of all the leaves are moved or guided when one or more leaves are operated. The devices 8 preferably comprise a rod 8ª and a lever 8ᶜ. The rod 8ª is preferably curved in order that it may move the free edge of the rearmost leaf 3ᵇ forwardly and rearwardly during the operation of the leaves forward and backward. The rod 8ª is provided at its upper end with means 8ᵇ whereby it may be detachably connected to the leaf 3ᵇ. The lever 8ᶜ is pivoted at one end, preferably to the under side of the support 2, while its opposite end is pivotally connected to the lower end of the rod 8ª.

Figures 1, 7, 8:
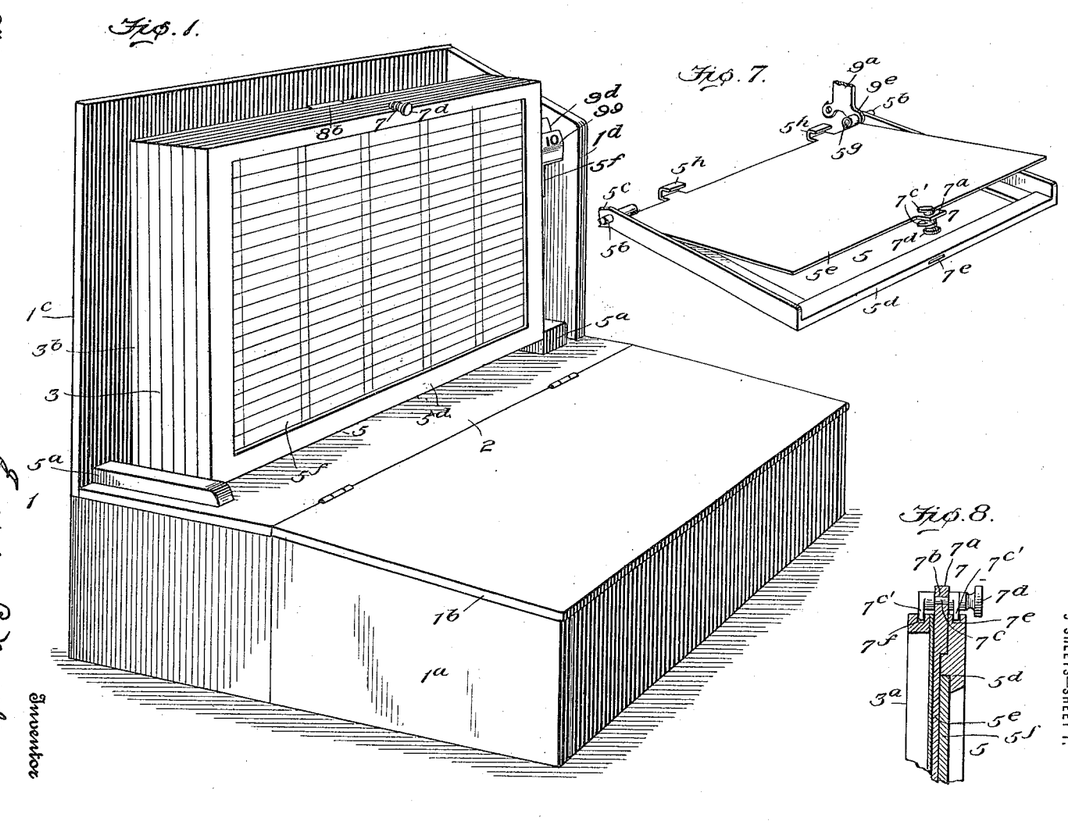
Figure 1 is a perspective view of a filing appliance embodying my invention.
Fig. 7 is a perspective view of the follower in reclined position.
Fig. 8 is a fragmentary sectional view through the upper portion of the follower and the locking means between the follower and the front leaf of the series of leaves.
Figures 2, 5:
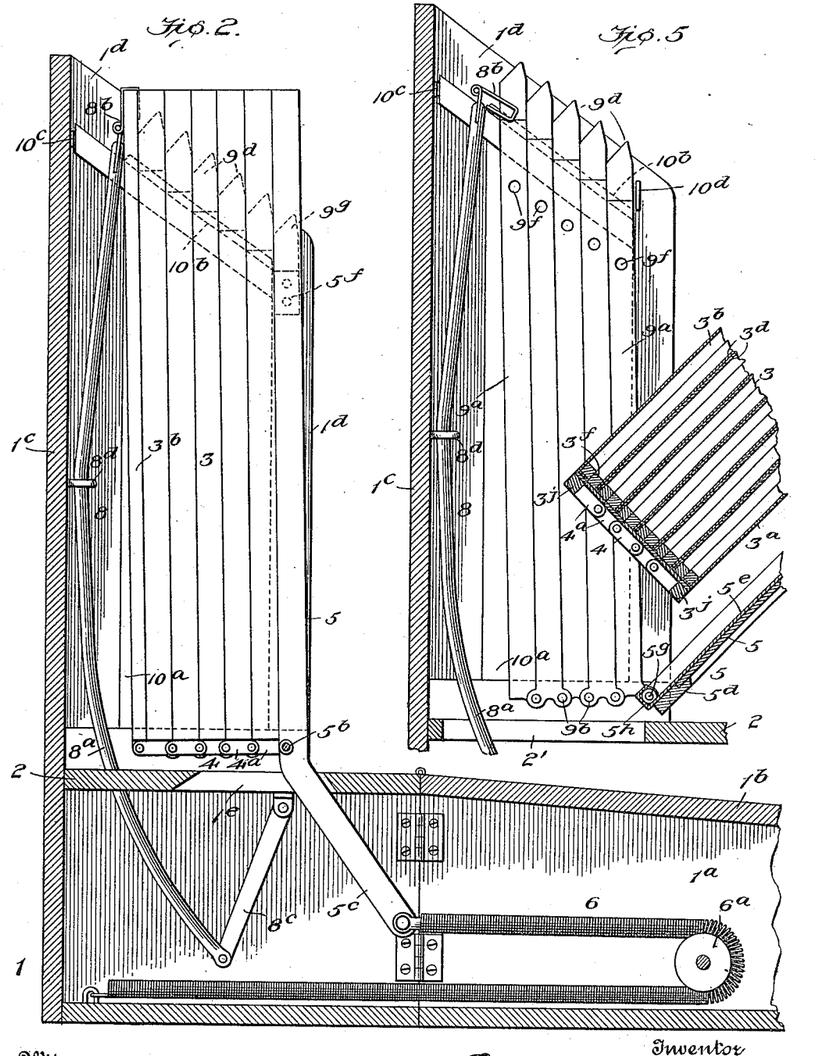
Fig. 2 is a side elevation thereof, with the side of the casing removed.
Fig. 5 is a fragmentary sectional elevation of the appliance, showing the set of leaves detached from the follower.
Figures 3, 6, 17:
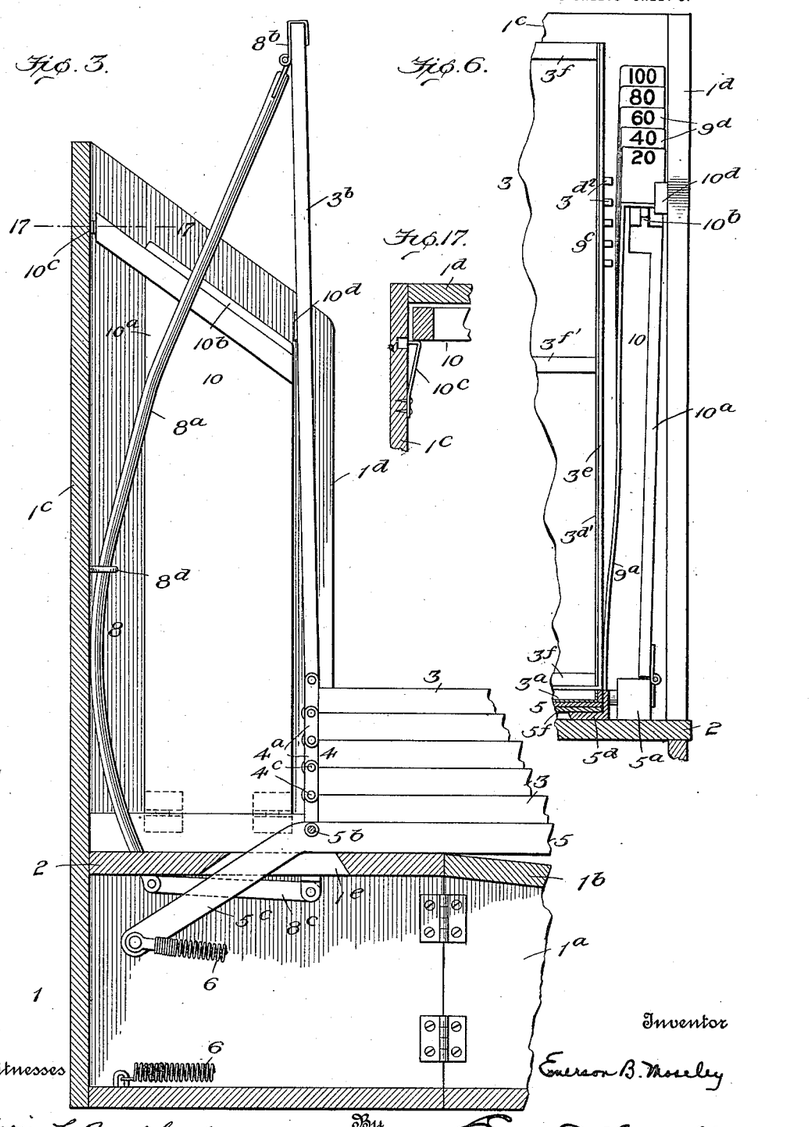
Fig. 3 is a fragmentary sectional elevation of the appliance, showing all of the leaves, except the rearmost leaf, in reclined position.
Fig. 6 is a fragmentary transverse sectional view, showing the operating devices disengaged from the leaves.
Fig. 17 is a fragmentary sectional view, showing the spring catch for the leaf-operating-rod-moving means.

8ᵈ indicates a guide carried by the casing back 1ᶜ. The guide 8ᵈ permits the rod 8ª to slide up and down as the leaves 3 are operated. The support 2 is formed with an opening 2′ through which the rod 8ª extends. By reference to Figs. 2 and 3, it will be seen that when one or more of the leaves 3 are operated, the rear leaf 3ᵇ will be elevated, thus raising the rod 8ª, and the lever 8ᶜ. As the rod 8ª is curved, the movement of the lever 8ᶜ about its fixed pivot operates to throw the upper end of the rod 8ª forwardly and thus guide the free end of the rear leaf 3ᵇ, and those leaves 3 not operated.

9 indicates, as a whole, means for independently or collectively operating the leaves 3, arranged at one side thereof. These means 9 comprise a series of rods or members 9ª, illustrated as spring rods, one for each leaf, pivot connections 9ᵇ between the rods 9ª at their lower ends, detachable connections 9ᶜ between each rod 9ª and the adjacent leaf 3 and operating devices or finders 9ᵈ, one for each rod 9ª. Preferably the rods 9ª extend down to the lower corners of the leaves 3 and the pivot connections 9ᵇ between the rods coincide with the adjacent pivot connections 4, respectively, for the leaves, so that each rod may operate in unison with its adjacent leaf 3. The rod 9ª for the leaf 3 immediately behind the front leaf 3ª is pivoted to the follower 5 upon the same axis as that upon which it swings, as shown at 9ᵉ. The connections 9ᶜ comprise a pin 3ᵈ² carried by each leaf near its upper end. This pin 3ᵈ² is receivable into and removable from an aperture or depression 9ᶠ formed in an adjacent rod 9ª, whereby the latter is connected to the leaf. By pressing or moving the rod 9ª in a direction away from the leaf, it may be detached therefrom. The rods 9ª are of different lengths in order that the operating devices 9ᵈ, one of which is carried by each rod, may be arranged in stepped order from front to rear. Preferably the upper ends of the rods are bent at right angles to form supports for the devices 9ᵈ. The opposite faces of the devices 9ᵈ are inclined toward each other, in order that the index numerals or marks for the leaves carried by the devices 9ᵈ can be readily seen when one or more rods are either in an upright or a horizontal position.

9ᵍ indicates an operating device for the front leaf 3ª. This device 9ᵍ is mounted on a support 5ᶠ extending laterally from the follower 5 and slightly below the operating device 9ᵈ for the next or succeeding leaf 3. As the front leaf 3ª is secured directly to the follower, no operating rod therefor is necessary, the operating device 9ᵍ serving as the means for operating the follower and front leaf 3ª. The operating device 9ᵍ is constructed similar to the devices 9ᵈ and carries index numerals or marks upon its opposite faces.

10 indicates, as a whole, means for moving all of the leaf operating rods 9ª, simultaneously, into and out of engagement with the respective adjacent leaves 3. These means may comprise a plate 10ª, hinged along its lower edge, and a rod or rib 10ᵇ carried thereby. The rod or rib 10ᵇ is inclined upwardly from front to rear, so that when the operating devices swing into upright position they will each engage therewith. Each of the operating devices 9ᵈ is formed with a groove into which the rod or rib 10ᵇ fits when the operating rods 9ª are in upright position. When the operating rods are in this position, it will be understood that by swinging the plate 10ª on its hinges to the right in the drawings or away from the leaves, all of the rods 9ª will be detached simultaneously from the leaves 3. A suitable catch and release device, such as shown at 10ᶜ, may be provided for holding the plate 10ª in this latter position.

10ᵈ indicates a stop preferably carried by the upright 1ᵈ for holding the operating rods 9ª in upright position after they are detached from the leaves 3. When the rods 9ª are detached from the leaves 3, the latter may be removed from the casing or housing 1 and placed in a vault or other place for storage and safe keeping. After the leaves are replaced in the casing or housing, the plate 10ª may be released from the device 10ᶜ. The tension of the rods 9ª will swing the plate 10ª back to normal position and the pins 3ᵈ² will enter the depressions 9ᶠ, thus connecting the rods 9ª to the leaves 3. The plate 10ª may be moved manually if desired. Each of the finders carries a suitable index character or characters to indicate the series of indexed filing sections or places on either or both sides of the leaf to which the finder in normal operation is connected, so that in order to expose any desired independent holding section or portion, one simply glances at the stepped row of finders, his eye catches the prominently exposed index character on the finder, which indicates to him the leaf to which he desires to gain access, and he grasps the finder which will expose the section in question and pulls forward and downwardly upon it, swinging all of the leaves in front of said finder and the one connected to it into their reclined position.

Economy of space into which the leaves, when detached from the register, may be assembled, is one of the essential characteristics of a filing device of this character. Vault space or safe space is usually limited in area, and the less of such space taken up by a set of leaves, the better. The leaves in my improved filing appliance, when they are removed from the housing or cabinet, are arranged in a compact rectangular block. The series of leaves in the cabinet should have some simple, accurate, and quick method of indexing in order to facilitate their accurate and rapid operation in actual practice. This I have provided for by the finders arranged in stepped relation to each other at one side of the series of leaves and adapted, in normal operation of the apparatus, each to engage with and serve as an operating finder or device for one of the leaves of the series.

To those skilled in the art of making appliances of the class described, many alterations in construction and widely differing embodiments and applications of my invention will suggest themselves, without departing from the spirit and scope thereof. My disclosures and the description therein are purely illustrative, and are not intended to be in any sense limiting.

What I claim is:—

1. In a filing appliance, the combination of a support, a series of leaves arranged to swing from a vertical position to a horizontal position, and vice versa, and relative to each other, a follower pivotally mounted upon said support and comprising a frame and a backing plate provided with a hook member arranged to receive and support the front end leaf of the series of leaves, and means carried by the upper end of the backing plate for securing the upper edge of the front leaf of the series of leaves, the backing plate and frame together.

2. In a filing appliance, the combination of a support, a series of leaves arranged to move relative to said support and to each other, a follower pivotally mounted upon said support and comprising a frame and a backing plate hinged at its lower edge to the frame, means carried by the said plate for supporting the lower end of the front leaf of the series of leaves, and separate means for locking free edges of the plate, the frame, and the front leaf of the series of leaves together.

3. In a filing appliance, the combination of a support, a series of leaves pivotally mounted relatively to said support and to each other, and operating means, one for each leaf and connected thereto, swingable on axes coincident with the axes of the said leaves for operating one or more of the leaves.

4. In a filing appliance, the combination of a support, a series of leaves pivotally mounted relatively to said support and to each other, operating means detachably connected with the leaves for operating one or more of said leaves, and means for simultaneously detaching the said operating means from the leaves.

5. In a filing appliance, the combination of a support, a series of leaves pivotally mounted relatively to said support and to each other, and operating means comprising a series of rods, means for hingedly connecting the rods together at their lower ends on axes coincident with the axes of the leaves, and means for detachably connecting the said rods at or near their upper ends to the leaves.

6. In a filing appliance, the combination of a support, a series of leaves pivotally mounted relatively to said support and to each other, operating means comprising a series of rods, means for hingedly connecting the rods together at their lower ends on axes coincident with the axes of the leaves, means for detachably connecting the said rods at or near their upper ends to the leaves, and operating devices secured to the rods.

7. In a filing appliance, the combination of a support, a series of leaves pivotally mounted relatively to said support and to each other, operating means comprising a series of rods, means for pivotally supporting the rods at their lower ends on axes coincident with the axes of the leaves, means for detachably connecting the said rods at or near their upper ends to the leaves, operating devices secured to the rods, and means for detaching the operating means from the leaves.

8. In a filing appliance, the combination of a support, a series of leaves pivotally mounted relatively to said support and to each other, operating means comprising a series of spring rods, means for hingedly connecting the rods together at their lower ends on axes coincident with the axes of the leaves, and means for detachably connecting the said rods at or near their upper ends to the leaves.

9. In a filing appliance, the combination of a support, a follower pivotally mounted on said support, a series of pivotally mounted leaves connected to and supported at one end by said follower, a series of operating rods one for each leaf, means for pivoting the rods together on axes coincident with the axes of the leaves, and means for pivoting the front rod of the series of rods to the follower.

10. In a filing appliance, the combination of supporting means, a series of leaves pivotally connected together, means for supporting the series of leaves at its front end, and guiding means for the upper edge of the rearmost leaf, the said guiding means comprising a curved rod engaging the said leaf at its upper end, and a lever pivoted to the casing at one end and having its opposite end pivotally connected to the lower end of the curved rod.

11. In a filing appliance, the combination of supporting means, a series of leaves pivotally connected together, means for supporting the series of leaves at its front end, and guiding means for the upper edge of the rear leaf, the said guiding means comprising a curved rod engaging the said leaf at its upper end, a lever pivoted to the casing at one end and having its other end pivotally connected to the lower end of the curved rod, and a guide for the said rod carried by the supporting means.

12. In a filing appliance, the combination of supporting means, a series of pivotally mounted leaves removably supported on the supporting means, and a series of pivotally mounted operating devices, one for each leaf, detachably connected thereto to permit the removal of the leaves from the supporting means.

13. In a filing appliance, the combination of supporting means, a series of pivotally mounted leaves removably supported on the supporting means, a series of pivotally mounted operating devices, one for each leaf, detachably connected thereto to permit the removal of the leaves from the supporting means, and means for moving the operating devices simultaneously into and out of operative engagement with the leaves.

14. In a filing appliance, the combination of supporting means, a series of pivotally mounted leaves removably supported on the supporting means, and a series of pivotally mounted operating devices, one for each leaf, detachably connected thereto to permit the removal of the leaves from the supporting means, and each movable with an adjacent leaf on an axis coincident with the axis of said adjacent leaf.

15. In a filing appliance, the combination of a plurality of pivotally mounted leaves, means for supporting the same, and finders for said leaves, each, in the normal operation of the apparatus, arranged to engage with one of the leaves of the series, and each adapted to be disconnected from its respective leaf when for any reason it is desired to remove the leaves from their said supporting means.

16. In a filing appliance, the combination of a plurality of pivotally mounted leaves, means for supporting the same, and a plurality of finders, one for each leaf, movable collectively into and out of engagement with said leaves.

17. In a filing appliance, the combination of a plurality of pivotally mounted leaves, and a plurality of finders, one for each leaf, arranged in stepped relation from front to rear, and movable collectively into and out of engagement with said leaves.

18. The combination of a support, a follower pivotally mounted on said support, a series of geared together leaves free to swing relative to each other, the front leaf of the series being supported by said follower, and a series of operating devices, one for each leaf, geared together at their lower ends on axes coincident with the axes of the leaves and arranged at one side thereof, the front operating device being connected with and supported by the follower and arranged to operate it and the front leaf.

19. The combination of a series of leaves having gear connections between them permitting the leaves to swing relative to each other, means for supporting one end leaf of the series, and a series of operating devices arranged at one side of the leaves and pivotally connected together on axes coincident with the axes of the leaves, the said devices being of different lengths whereby their upper ends are arranged in stepped relationship.

20. In a filing appliance, the combination of a series of leaves of uniform shape and size, a support therefor, gear connections between the leaves permitting them to swing relative to each other, operating devices, one for each leaf, arranged at one side thereof, and means for hingedly connecting the devices together on axes coincident with the axes of the leaves.

21. In a filing appliance, the combination of a series of leaves of uniform shape and size, a support therefor, gear connections between the leaves permitting them to swing relative to each other, and operating devices, one for each leaf, arranged at one side thereof, the said devices being of different lengths and each detachably connected to the adjacent leaf to permit the removal of the series of leaves from its support.

22. In a filing appliance, the combination of a support, a series of leaves mounted on said support and arranged to swing relative thereto and to each other, and operating means detachably connected with said leaves for operating them, the said means comprising a series of resilient rods, one for each leaf, arranged to be normally connected to said leaves.

23. In a filing appliance, the combination of a support, a series of leaves mounted on said support and arranged to swing relative thereto and to each other, operating means detachably connected with said leaves for operating them, the said means comprising a series of resilient rods, one for each leaf, arranged to be normally connected to said leaves, and means for detaching said rods from the leaves simultaneously.

24. In a filing appliance, the combination of a support, a series of leaves mounted on said support and arranged to swing relative thereto and to each other, operating means detachably connected with said leaves for operating them, the said means comprising a series of resilient rods, one for each leaf, arranged to be normally connected to said leaves, and means for locking or holding said rods out of engagement with said leaves.

25. An account-register having, in combination, a series of bill-holder frames pivotally connected at the bottom, and a movement-checking device connected with the foremost frame and operating during the downward movement thereof, to resist such movement yieldingly and prevent slamming of the frames.

26. An account-register having, in combination, a series of bill-holder frames hinged directly together at the bottom, means for maintaining the frames normally in upright position, a pivotally-mounted support for the frames adapted for interlocking engagement with the foremost frame, an arm projecting rigidly and downwardly from said support, and a movement-checking device connected with said arm and arranged to resist rearward movement thereof.

In testimony whereof I affix my signature, in the presence of two witnesses.

EMERSON B. MOSELEY.

Witnesses:
H. B. BUCKLIN,
LAURENCE C. KEELER.

Copies of this patent may be obtained for five cents each, by addressing the "Commissioner of Patents, Washington, D. C."